US011765710B2

(12) United States Patent
Rudolf et al.

(10) Patent No.: US 11,765,710 B2
(45) Date of Patent: *Sep. 19, 2023

(54) METHOD FOR TRANSMIT AND RECEIVE POWER CONTROL IN MESH SYSTEMS

(71) Applicant: InterDigital Technology Corporation, Wilmington, DE (US)

(72) Inventors: Marian Rudolf, Montreal (CA); Vincent Roy, Longueuil (CA)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/353,239

(22) Filed: Jun. 21, 2021

(65) Prior Publication Data

US 2021/0314949 A1 Oct. 7, 2021

Related U.S. Application Data

(63) Continuation of application No. 16/812,768, filed on Mar. 9, 2020, now Pat. No. 11,044,728, which is a
(Continued)

(51) Int. Cl.
*H04W 72/04* (2023.01)
*H04W 52/18* (2009.01)
(Continued)

(52) U.S. Cl.
CPC ......... *H04W 72/0473* (2013.01); *H04W 4/06* (2013.01); *H04W 52/18* (2013.01);
(Continued)

(58) Field of Classification Search
CPC ... H04W 72/0473; H04W 4/06; H04W 52/18; H04W 52/362; H04W 52/367;
(Continued)

(56) References Cited

U.S. PATENT DOCUMENTS 5,450,616 A 9/1995 Rom
5,455,964 A 10/1995 Roos et al.
(Continued)

FOREIGN PATENT DOCUMENTS

| EP | 1 515 494 | 3/2005 |
|---|---|---|
| WO | 98/056140 | 12/1998 |
| WO | 04/079919 | 9/2004 |

OTHER PUBLICATIONS

"802.11h™—IEEE Standard for Information technology—Telecommunications and information exchange between systems—Local and metropolitan area networks—Specific requirements Part 11: Wireless LAN Medium Access Control (MAC) and Physical Layer (PHY) specifications—Amendment 5: Spectrum and Transmit Power Management Extensions in the 5 GHz band in Europe." IEEE Std. 802.11h™-2003.

(Continued)

*Primary Examiner* — Michael J Brown
(74) *Attorney, Agent, or Firm* — Volpe Koenig

(57) ABSTRACT

A method and apparatus for controlling transmit power in a wireless local area network (WLAN). For example, a station may receive, from an access point (AP), a beacon frame that includes a field indicating a maximum transmission power for at least one of a plurality of operational bandwidth that the AP supports. The station may determine a transmission power for a signal to be transmitted to the AP based on the at least one of the plurality of operational bandwidths indicated in the received beacon. The station may then transmit the signal at the determined transmission power.

20 Claims, 5 Drawing Sheets

Related U.S. Application Data continuation of application No. 15/985,287, filed on May 21, 2018, now Pat. No. 10,624,098, which is a continuation of application No. 15/621,010, filed on Jun. 13, 2017, now abandoned, which is a continuation of application No. 15/069,020, filed on Mar. 14, 2016, now Pat. No. 9,693,354, which is a continuation of application No. 14/535,986, filed on Nov. 7, 2014, now Pat. No. 9,301,261, which is a continuation of application No. 11/398,122, filed on Apr. 5, 2006, now Pat. No. 8,909,945.

(60) Provisional application No. 60/684,452, filed on May 25, 2005, provisional application No. 60/669,599, filed on Apr. 8, 2005.

(51) Int. Cl.
| | | |
|---|---|---|
| *H04W 72/044* | (2023.01) | |
| *H04W 52/36* | (2009.01) | |
| *H04W 52/46* | (2009.01) | |
| *H04W 84/18* | (2009.01) | |
| *H04W 4/06* | (2009.01) | |
| *H04L 12/18* | (2006.01) | |
| *H04L 1/00* | (2006.01) | |
| *H04L 27/26* | (2006.01) | |
| *H04W 52/14* | (2009.01) | |
| *H04W 52/54* | (2009.01) | |
| *H04W 74/00* | (2009.01) | |
| *H04W 52/50* | (2009.01) | |
| *H04W 84/12* | (2009.01) | |
| *H04W 52/24* | (2009.01) | |
| *H04W 52/28* | (2009.01) | |

(52) U.S. Cl.
CPC ....... *H04W 52/362* (2013.01); *H04W 52/367* (2013.01); *H04W 52/46* (2013.01); *H04W 84/18* (2013.01); *H04L 1/0001* (2013.01); *H04L 12/18* (2013.01); *H04L 27/2655* (2013.01); *H04W 52/146* (2013.01); *H04W 52/243* (2013.01); *H04W 52/286* (2013.01); *H04W 52/50* (2013.01); *H04W 52/54* (2013.01); *H04W 74/002* (2013.01); *H04W 84/12* (2013.01)

(58) Field of Classification Search
CPC ... H04W 52/46; H04W 84/18; H04W 52/146; H04W 52/243; H04W 52/286; H04W 52/50; H04W 52/54; H04W 74/002; H04W 84/12; H04W 52/08; H04W 52/24; H04L 1/0001; H04L 12/18; H04L 27/2655
USPC ......................................................... 370/338
See application file for complete search history.

(56) References Cited

U.S. PATENT DOCUMENTS

| | | |
|---|---|---|
| 5,778,030 A | 7/1998 | Bruckert et al. |
| 5,805,994 A | 9/1998 | Perreault |
| 6,072,784 A | 6/2000 | Agrawal et al. |
| 6,292,484 B1 | 9/2001 | Oliver |
| 6,292,494 B1 | 9/2001 | Baker et al. |
| 6,334,047 B1 | 12/2001 | Andersson et al. |
| 6,345,043 B1 | 2/2002 | Hsu |
| 6,571,103 B1 | 5/2003 | Novakov |
| 6,708,041 B1 | 3/2004 | Butovitsch et al. |
| 6,738,599 B2 | 5/2004 | Black et al. |
| 6,785,510 B2 | 8/2004 | Larsen |
| 6,807,429 B2 | 10/2004 | Subrahmanya |
| 6,834,045 B1 | 12/2004 | Lappeteläinen et al. |
| 6,870,815 B2 | 3/2005 | McFarland et al. |
| 6,978,151 B2 | 12/2005 | Choi et al. |
| 7,010,316 B2 | 3/2006 | Chen |
| 7,103,314 B2 | 9/2006 | Li |
| 7,162,250 B2 | 1/2007 | Misra |
| 7,286,846 B2 | 10/2007 | Chen et al. |
| 7,336,638 B2 | 2/2008 | Cheng et al. |
| 7,352,728 B2 | 4/2008 | Soomro |
| 7,801,544 B2 | 9/2010 | Soomro et al. |
| 9,301,261 B2 * | 3/2016 | Rudolf .................. H04W 52/18 |
| 9,693,354 B2 | 6/2017 | Rudolf et al. |
| 2002/0044533 A1 | 4/2002 | Bahl et al. |
| 2002/0072329 A1 | 6/2002 | Bandeira et al. |
| 2002/0097696 A1 | 7/2002 | Kossi et al. |
| 2002/0159434 A1 | 10/2002 | Gosior et al. |
| 2003/0064752 A1 | 4/2003 | Adachi et al. |
| 2003/0100328 A1 | 5/2003 | Klein et al. |
| 2003/0125069 A1 | 7/2003 | Lee |
| 2003/0139187 A1 | 7/2003 | Zhang et al. |
| 2003/0139197 A1 | 7/2003 | Kostic et al. |
| 2003/0189907 A1 | 10/2003 | Miyamoto et al. |
| 2003/0212827 A1 | 11/2003 | Saha et al. |
| 2003/0214967 A1 | 11/2003 | Heberling |
| 2004/0132478 A1 | 7/2004 | Yu |
| 2004/0166846 A1 | 8/2004 | Backes et al. |
| 2005/0013275 A1 | 1/2005 | Black et al. |
| 2005/0048960 A1 | 3/2005 | Yamauchi et al. |
| 2005/0070294 A1 | 3/2005 | Lyle et al. |
| 2005/0075124 A1 | 4/2005 | Willenegger et al. |
| 2005/0083895 A1 | 4/2005 | Pinault |
| 2005/0197147 A1 | 9/2005 | Stephens et al. |
| 2006/0092855 A1 | 5/2006 | Chiu |
| 2006/0193334 A1 | 8/2006 | Hazra et al. |
| 2006/0227215 A1 | 10/2006 | Yamauchi |

OTHER PUBLICATIONS

"IEEE P802.s™/D0.01—Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking." IEEE P802.11s/D0.01, Mar. 2006.

"IEEE Standard for Information technology—Telecommunications and information exchange between systems—Local and metropolitan area networks—Specific requirements Part 11: Wireless LAN Medium Access Control (MAC) and Physical Layer (PHY) specifications—Amendment 3: Specification for operation in additional regulatory domains." Jun. 14, 2001. IEEE Std. 802.11d-2001.

"IEEE Wireless LAN Edition—A compilation based on IEEE Std 802.11™-1999 (R2003) and it amendments." Sep. 19, 2003.

Bohm et al., "Fast Circuit Switching for the Next Generation of High Performance Networks," IEEE Journal on Selected Areas in Communications, vol. 14, Issue 2, pp. 298-305 (Feb. 1996).

Conner et al., "Draft 802.11 TGs Functional Requirements and Scope," IEEE P802.11 Wireless LANs, IEEE 802.11-04/1174R9 (Nov. 18, 2004).

IEEE, "Draft Supplement to STANDARD for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.15, Jun. 2004.

IEEE, "Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment 7: Specification for Radio Resource Measurement," IEEE P802.11k/D1.4, Jan. 2005.

IEEE, "Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment 7: Specification for Radio Resource Measurement," IEEE P802.11k/D3.5, Mar. 2006.

(56) References Cited

OTHER PUBLICATIONS

Lopez-Rodriguez et al., "Distributed Method for Channel Assignment in CDMA Based "Ad-Hoc" Wireless Local Area Networks;" IEEE; 1999; pp. 11-16.

Palit et al., "Mobility-Aware Pro-active Low Energy (MAPLE) Clustering in Ad hoc Mobile Wireless Networks;" IEEE Communications Society; 2004; pp. 3426-3430.

Wang et al., "Joint Scheduling and Power Control for Multicasting in Wireless Ad Hoc Networks," IEEE Vehicular Technology Conference, pp. 2915-2920 (Oct. 2003).

\* cited by examiner

METHOD FOR TRANSMIT AND RECEIVE POWER CONTROL IN MESH SYSTEMS

CROSS REFERENCE TO RELATED APPLICATIONS

This application is a continuation of U.S. patent application Ser. No. 16/812,768, filed on Mar. 9, 2020, which issued as U.S. Pat. No. 11,044,728 on Jun. 22, 2021, which is a continuation of U.S. patent application Ser. No. 15/985,287, filed on May 21, 2018, which issued as U.S. Pat. No. 10,624,098, which is a continuation of U.S. patent application Ser. No. 15/621,010, filed on Jun. 13, 2017, which is a continuation of U.S. patent application Ser. No. 15/069,020, filed on Mar. 14, 2016, which issued as U.S. Pat. No. 9,693,354 on Jun. 27, 2017, which is a continuation of U.S. patent application Ser. No. 14/535,986, filed on Nov. 7, 2014, which issued as U.S. Pat. No. 9,301,261 on Mar. 29, 2016, which is a continuation of U.S. patent application Ser. No. 11/398,122, filed on Apr. 5, 2006, which issued as U.S. Pat. No. 8,909,945 on Dec. 9, 2014, which claims the benefit of U.S. Provisional Application No. 60/669,599, filed on Apr. 8, 2005, and U.S. Provisional Application No. 60/684,452, filed on May 25, 2005, which are incorporated by reference as if fully set forth.

FIELD OF INVENTION

This invention relates to wireless local area mesh networks. In particular, this invention relates to signaling mechanisms that can be implemented in a Mesh point (MP) in order to enable transmit (Tx) and receive (Rx) power control.

BACKGROUND

FIG. 1 shows a typical wireless system infrastructure, comprising a set of access points (APs), also referred to as base stations (BS), each connected to a wired network through what is referred to as a backhaul link. The wireless links exist between the APs and the user stations (STAs). In some scenarios, the cost of connecting a given AP directly to the wired network makes an alternative option more attractive, which is to connect the AP indirectly to the wired network via wireless connections to its neighboring APs. This is referred to as a Mesh architecture. FIG. 2A shows a block diagram of a simple Mesh architecture comprising a plurality of Mesh points (MPs), each capable of supporting control, management and operation services for the Mesh. FIG. 2B is a legend of elements illustrated in FIG. 2A. The MPs may either be a dedicated infrastructure device (e.g., a Mesh AP (MAP)) or a user device (e.g., a STA) that is able to fully participate in the formation and operation of the Mesh network. Advantages of using a Mesh infrastructure include ease-of-use and speed of deployment since a radio network can be deployed without having to provide backhaul links and interconnection modules for each AP.

One very important operational consideration is that Tx power settings of Mesh nodes are regulated in order to meet regulatory requirements. Operation of wireless radio communications today is regulated by the FCC (and their counterparts in other countries). In particular, certain maximum Tx power settings are mandated in order to minimize interference of un-licensed radio equipment such as WLANs for most frequency bands. Moreover, these regulatory requirements usually change per regulatory domain (e.g., U.S., Europe, Japan). Typical regulatory requirements for conventional WLANs operating in infrastructure mode (basic service set (BSS)) or AdHoc mode (Independent BSS (IBSS)) are summarized as follows (i.e., Mesh operation is not addressed by this existing standard).

Transmit power control (TPC) under IEEE 802.11h for 5 GHz band WLANs is primarily motivated by different regulatory Tx power allowances in the 5 GHz band assignments in Europe, but is also required by the FCC in the US. Different regulatory power requirements for the 5 GHz band include:

Lower U-NII (5.25-5.35 GHz, 4 channels) 40 mW US, 200 mW Europe

Middle U-NII (5.35-5.45 GHz, 4 channels) 200 mW US and Europe (5.47-5.725 GHz, 11 channels) Europe-only, 1000 mW Upper-U-NII (5.725-5.825 GHz, 5 channels) US-only, 800 mW The maximum admissible Tx power setting for any STA in the BSS or IBSS is the Power Constraint information element (IE) subtracted from the Regulatory Max Power value contained in the Country (IE). The Country IE (802.11d) is contained in BEACON and PROBE RESPONSE frames. Similarly, 802.11h puts the Power Constraint IE into BEACON and PROBES RESPONSE frames.

TPC under IEEE 802.11h adds a Power Capability IE to ASSOCIATION REQUESTS (RE-ASSOCIATION REQUESTS) sent from the STA to the AP (or STA in IBSS). This Power Capability IE is an indication of the possible minimum and maximum Tx power settings of the transmitting STA to the receiving STA.

Association attempts by STAs are to be refused by the AP or other STAs in an IBSS if the range indicated in their Power Capability IE does not allow operation with the current BSS regulatory settings. The AP is the only authority in the BSS that can change the admissible power setting for the BSS. In an IBSS, the STA that starts the IBSS is the one that sets admissible power settings and other STAs that subsequently broadcast the BEACON frame are required to propagate this initial power setting.

In the BSS case, the admissible power settings (regulatory in Country IE and offset in Power Constraint IE) can change during the lifetime of the BSS. Range control and interference reduction are specifically cited in 802.11h as one purpose for this feature. However, it is preferred that these changes in the settings should not happen "too often".

One of the problems is that even if every BEACON can be used to change the power settings, not all STAs (for example the ones in packet switched (PS) mode) listen to every BEACON frame. Therefore, maximum Tx power changes are semi-static in the sense that it requires at least several target beacon transmission times (TBTTs) (hundreds of milliseconds) to have a new Tx power setting adopted by all STAs in the BSS.

Officially, 802.11h TPC requires a STA to check the admissible Tx power setting any time it tries to access the channel. However, it is doubtful that all manufacturers have implemented an automatic update from the latest received BEACON frame into their MAC firmware. It is reasonable to assume that this happens only once in a while, in extreme cases only during association or re-association.

TPC under 802.11h also introduces a TPC REQUEST/REPORT action frame pair. This TPC REQUEST action frame is used by a STA to request Tx power settings and link margin from another STA. The reported Tx power in the TPC REPORT action frame is the one used for sending the TPC report. The link margin reported is the one observed by the receiver when the TPC REQUEST action frame was received.

The IEs contained in the TPC REPORT action frame can also be put into the BEACON and PROBE RESPONSES, originally intended to address some special problems with IBSS mode. However, the link margin field in this case is meaningless and simply set to zero. These new 802.11h TPC-relevant IEs and action frames are found in Class 1 frames (i.e. they can be sent from and received by non-authenticated and non-associated STAs).

For completeness, 802.11h TPC functionality for the 5 GHz band is extended "as-is" into 2.4 GHz by the 802.11k draft amendment.

In order to allow ease of deployment and ease of adoption to a new deployment environment, a means to adopt allowed Tx power settings for Mesh equipment is needed. In addition to these regulatory considerations, adaptive Tx power levels are highly desirable to maintain high throughput and guaranteed QoS levels in a Mesh network.

The Tx and Rx power level settings of the participating nodes in a Mesh have a large impact on perceived communication and interference range. Perceived communication range is the distance over which a certain data rate can be sustained in a point-to-point or point-to-multipoint transmission). The perceived interference range is the distance over which a transmission can still disturb or degrade other ongoing transmissions from other nodes in the Mesh on a channel (or even on adjacent channels), even though the transmission itself cannot be reliably decoded any more.

Usually, the least possible Tx power setting in an MP conditioned on maintaining a given sustained data rate for a given Mesh link is the best approach to minimize co-channel and adjacent channel interference to other nodes in the Mesh. On the other hand, maximum possible Tx power level settings allow higher net data transmit rates because this directly impacts the SNR as seen by the intended receiver. This implies that MPs face conflicting needs and preferences in terms of which Tx and Rx power level settings to use. The ideal Tx power level setting for a particular MP is therefore a trade-off between maximizing individual data rates on particular links (higher data rates with higher Tx power settings) and maximizing overall Mesh performance (better performance with less interference and more spatial reuse on the same channel).

Rx power level settings, such as clear channel assessment (CCA) detection thresholds and minimum Rx sensitivity, impact the link budget and, as such, the SNR observed in the receiver. The Rx power level settings also impact the likelihood of failed channel access or collisions in carrier sense multiple access (CSMA)-based schemes such as 802.11 WLANs.

However, the level of interference perceived by the different nodes of a wireless Mesh system can vary widely both geographically and in time. This is because of the dynamic radio environment and real-time time-varying characteristics of transmissions in a Mesh, such as load per link or path, occupied channel time, etc.

Therefore, a means for dynamically controlling Tx and Rx power levels of Mesh nodes during the Mesh network lifetime is desirable in order to keep Mesh throughput and QoS high and at guaranteed levels. Also, channel changes motivated because of regulatory requirements need to be addressed in a wireless Mesh network.

While traditional WLANs (802.11a,b,g,j,n) do not provide any means today to allow for an adoption of Tx power settings other than at initial start-up, an amendment (802.11h) was made to Wireless LAN Medium Access Control (MAC) and Physical Layer (PHY) specifications in order to satisfy regulatory requirements for operation in the 5 GHz band in Europe. IEEE 802.11h TPC only allows WLAN systems in the 5 GHz band to set Tx power settings during the initial association of incoming STAs and to some extent during the lifetime of the WLAN network (Infrastructure mode or AdHoc mode). However, the 802.11h amendment does not address the specific needs and constraints of Mesh systems. This case was simply not foreseen.

In particular, no means exist to ensure a selective Tx power change of a particular link within a Mesh. Moreover, only maximum admissible Tx power settings can be communicated. However, just as important as maximum admissible Tx power settings are, so too are the minimum power settings in order to guarantee establishment of links and to minimize probability of channel access collisions.

Variable Tx power settings would improve the radio efficiency of Mesh networks, but a method for achieving this feature is not provided by existing technology. Furthermore, a method for Tx power control needs to be devised to allow Mesh networks to meet certain regulatory requirements in the sense of 802.11h TPC similar to WLANs today operating in legacy infrastructure (such as in a BSS case) and AdHoc mode (such as in an IBSS case).

SUMMARY

A method and apparatus controls transmit and receive power level of a mesh point (MP) operating in a mesh wireless communication network of a plurality of MPs. Power capability information of a new MP is sent to at least one existing MP in the mesh network. The existing MP accepts the new MP as a member of the mesh network and sends allowed power setting information to the new MP. The new MP adjusts its power level in accordance with the allowed power setting information.

DETAILED DESCRIPTION OF THE PREFERRED EMBODIMENTS

Although the features and elements of the present invention are described in the preferred embodiments in particular combinations, each feature or element can be used alone (without the other features and elements of the preferred embodiments) or in various combinations with or without other features and elements of the present invention.

Hereafter, a mesh point includes but is not limited to a wireless transmit/receive unit (WTRU), user equipment, mobile station, fixed or mobile subscriber unit, pager, or any other type of device capable of operating in a wireless environment. When referred to hereafter, an access point includes but is not limited to a base station, Node-B, site controller, access point or any other type of interfacing device in a wireless environment.

The term "Mesh neighbor" herein refers to the immediate neighbors of a particular Mesh point, (i.e., the ones in radio range). It also refers to other Mesh nodes that the MP can reach when its signaling messages are forwarded through the Mesh over multiple hops by other MPs. It can also include network entities beyond the immediate reach of the wireless Mesh, such as nodes residing in the wired backhaul network connected with the Mesh.

The present invention provides signaling procedures and mechanisms that will provide the means by which Mesh systems can adjust Tx and Rx power levels for regulatory and radio management purposes at system start-up, when an MP joins the Mesh network and during the lifetime of the Mesh network. The invention addresses a distributed scenario (i.e., the MPs are engaged in "peer-to-peer" signaling), as well as a master-slave scenario, in which the relationship between MPs is one of master and slave. In the latter scenario, a Power Master (PM) is a master MP that is responsible for dictating the power settings in the Mesh, both the overall regulatory settings and the individual power settings per Mesh Point and per link.

The present invention includes methods and apparatus with means for:
a) Signaling by which MPs exchange power-setting relevant capability information such as maximum and minimum power settings;
b) Signaling by which MPs learn about allowed power settings in the Mesh;
c) An MP reacting to different or conflicting allowed power setting information messages and configuration parameters;
d) Power adjustments in the Mesh to meet regulatory requirements and to dynamically adjust power settings; and
e) Electing a given Mesh node as PM.

Figure 1:
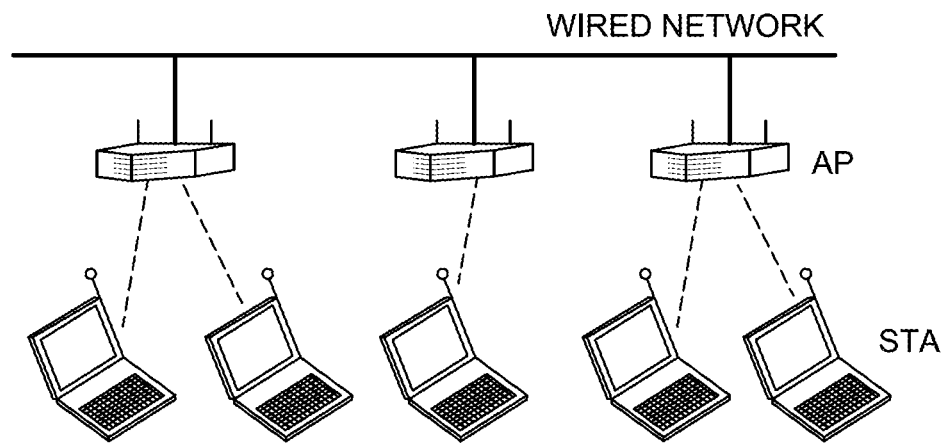
FIG. 1 shows block diagram of a conventional wireless LAN.
Figure 2A:
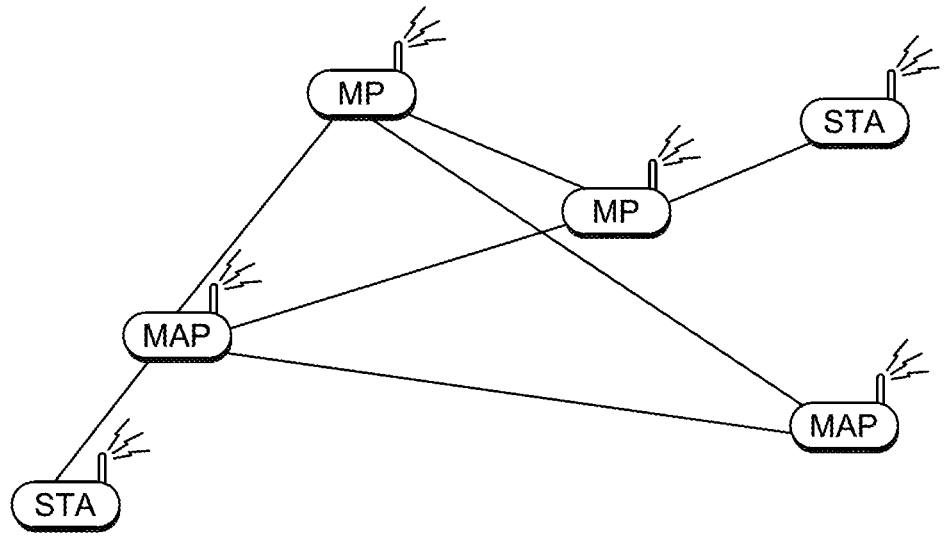
FIG. 2A shows a block diagram of a simple Mesh infrastructure and FIG. 2B is a legend of elements illustrated in FIG. 2A.
Figure 2B:
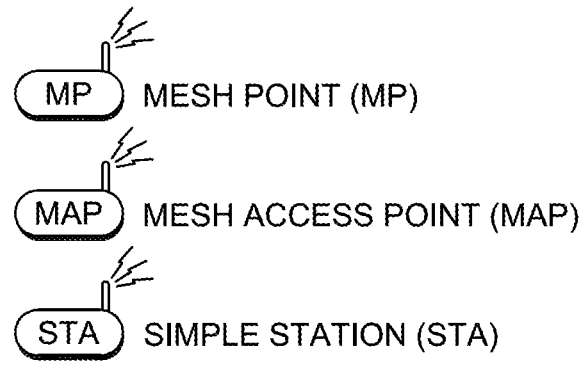
Figure 3A:
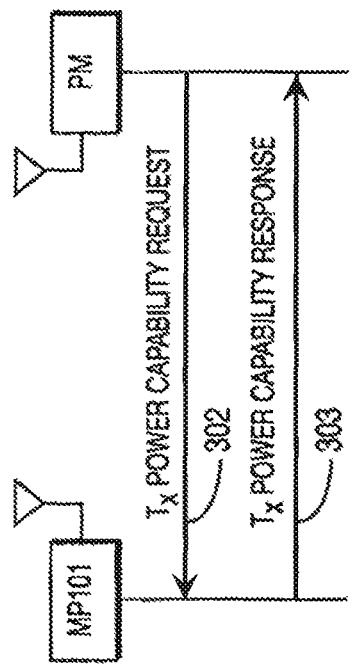
FIG. 3A shows a signaling diagram of a power capability information exchange between a Mesh point and a power master Mesh point and FIG. 3B shows another signaling diagram of a power capability information exchange between a Mesh point and a power master Mesh point.
Figure 3B:
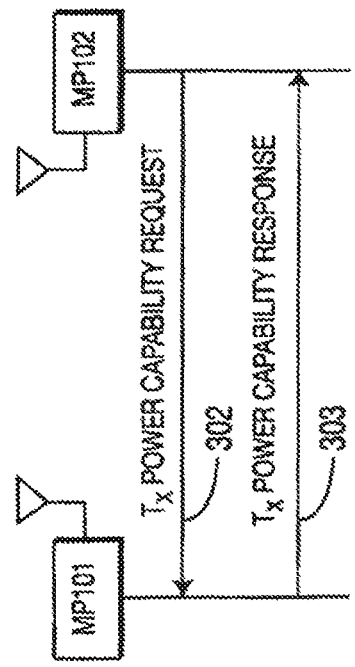

FIGS. 3A and 3B show signaling diagrams of a power capability information exchange between an MP 101 and a PM in a master-slave arrangement. The power capability information preferably includes, but is not limited to any of the items as shown in Table 1, including any combination thereof.

TABLE 1

Power Capability Information

| Type | Description |
| --- | --- |
| Tx power step sizes | Minimum and maximum Tx power and adjustment step size settings that the MP supports |
| Rx power step sizes | Minimum and maximum Rx power and adjustment step size settings, sensitivity levels and CCA thresholds settings that the MP supports |
| Mode | The operational modes (e.g., 802.11a, b, g, n, j, etc.) the MP is able to support |
| Bandwidth | The operational bandwidth that the MP is able to support (e.g., 802.11n supports bandwidths of 10/20/40 MHz and 802.11j supports 10 or 20 MHz bandwidths) |
| Freq. Bands | The number of bands and sub-bands on which the MP is capable of simultaneous operation (e.g., 2.4 GHz, 5 GHz, 5 GHz Lower U-NII, 5 GHZ Middle U-NII) |

Figure 3C:
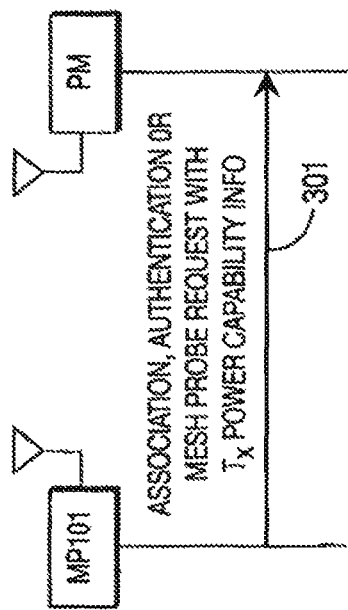
FIG. 3C shows a signaling diagram of a distributed power capability information exchange between Mesh points and FIG. 3D shows another signaling diagram of a distributed power capability information exchange between Mesh points.
Figure 3D:
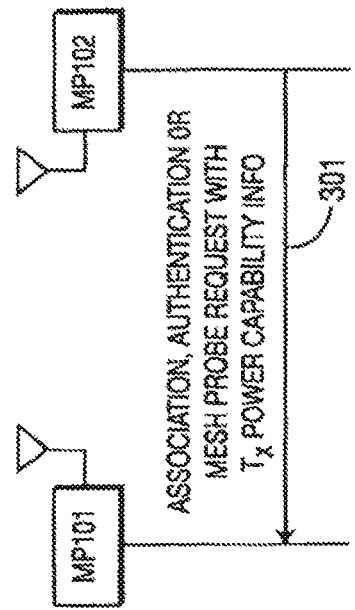

In FIG. 3A, an MP 101 reports its power capability information 301 to the PM in an un-solicited manner, such as part of a broadcast/multicast-type frame for example. In FIG. 3B, MP1 reports its power capability information 303 in a solicited manner as a response-type frame in response to a power capability request 302 (e.g., the exchanged signals 302, 303 may be in the form of a directed unicast request/response-type frame exchange between the MP 101 and the PM. Although FIGS. 3A and 3B show power capability information signaling between the MP 101 and the PM, such signaling may also be exchanged between MP 101 and other neighboring MPs. FIGS. 3C and 3D show such a distributed scenario of power capability information exchanged between the MP 101 and an MP 102 similar to that shown in FIGS. 3A and 3B.

According to the present invention, solicited (request/report-type) reporting and un-solicited reporting of power capability information 301, 303 by MPs can be sent as a piggy-backed IE on top of a Mesh unicast, multicast or broadcast management or control frame. Alternatively, the reporting of power capabilities can be sent as a separate Mesh unicast, multicast or broadcast management or control frame.

As an example of a Mesh management frame embodiment, the MP power capability information 301, 303 may be included as an additional IE in a Mesh ASSOCIATION frame or a Mesh AUTHENTICATION frame (e.g., frame exchanges with other MPs for the purpose of becoming part of the Mesh network). Alternatively, the power capability signaling information 301, 303 is included as an additional IE within a Mesh BEACON frame or a Mesh PROBE RESPONSE frame, which may also be used in exchanges for the purpose of discovering the presence of a Mesh network or synchronizing general Mesh parameters such as timer values. Another alternative is to include the power capability information 301, 303 as an IE in an Association or Re-Association Response frame. Another alternative is to include the power capability information 301, 303 as part of a directed special purpose per-link or multi-hop Mesh POWER CAPABILITY frame.

Figure 4B:
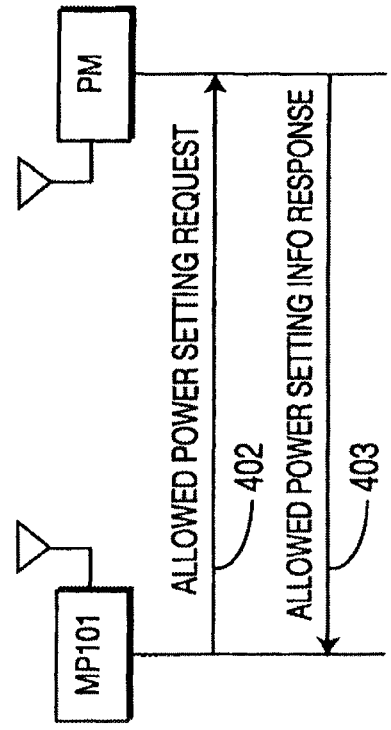
FIG. 4A shows a signaling diagram of Mesh allowed power settings information retrieval from a power master Mesh point and FIG. 4B shows another signaling diagram of Mesh allowed power settings information retrieval from a power master Mesh point.
Figure 4D:
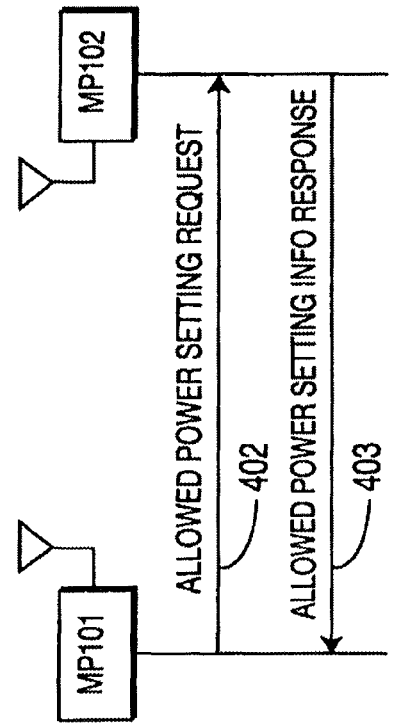
FIG. 4C shows a signaling diagram of Mesh allowed power settings information retrieval from other Mesh points and FIG. 4D shows another signaling diagram of Mesh allowed power settings information retrieval from other Mesh points.
Figure 4A:
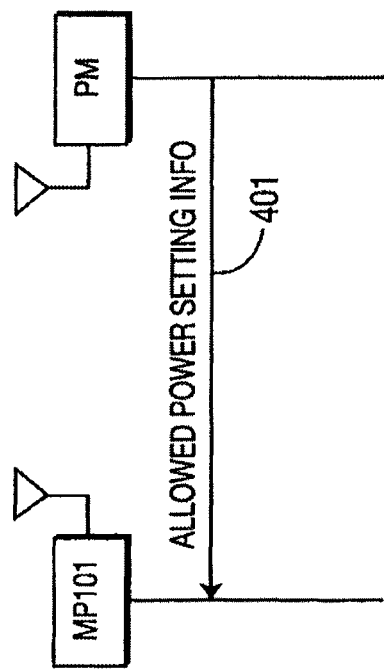

FIGS. 4A and 4B show a signaling diagram by which an MP learns of allowed power settings for the Mesh, which is useful for dealing with the regulatory need for MPs not to exceed certain maximum admissible power settings during communication. The allowed power setting information preferably includes (but is not limited to) any of the items as shown in Table 2, including any combination thereof.

TABLE 2

Allowed Power Setting Information

| Type | Description |
| --- | --- |
| PM Info | PM address or PM identifier |
| Mode | Regulatory domain within which the Mesh network currently operates (e.g., 802.11b, g, n, j, etc.) |
| Freq. Bands | frequency bands and sub-bands within which the Mesh network currently operates |
| Tx Power | minimum, instantaneous, and maximum allowed Tx power settings |
| Rx Power | minimum, instantaneous, and maximum allowed Rx power settings |
| CCA | minimum, instantaneous, and maximum allowed CCA threshold settings |
| Timing | validity timers or time-out values |
| Measurement | measurement intervals and configuration |
| Timing | validity timers or time-out values |
| Silence | silence periods |
| Offset | temporary offset values for any of the above plus associated life-time values |

Figure 4C:
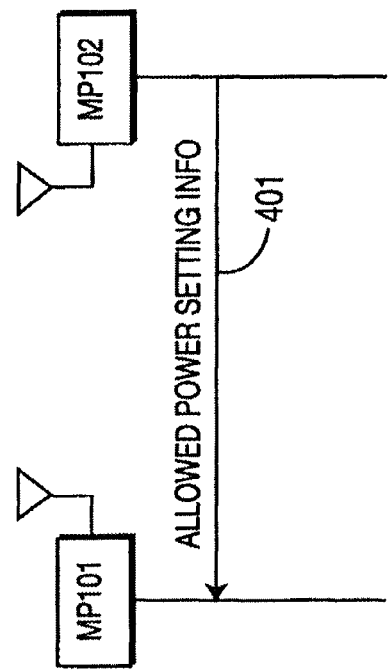

A master-slave scenario is depicted in FIGS. 4A and 4B, in which a slave MP 101 obtains this information from the master PM. In FIG. 4A, MP 101 obtains its allowed power setting information 401 from the PM in an un-solicited manner, such as part of a broadcast/multicast-type frame for example. In FIG. 4B, MP1 obtains its allowed power setting information 403 in a solicited manner as a response-type frame in response to a power capability request 402 (e.g., the exchanged signals 402, 403 may be in the form of a directed unicast request/response-type frame exchange between the MP 101 and the PM. Although FIGS. 4A and 4B show allowed power setting information signaling between MP101 and the PM, such signaling may also be exchanged similarly in a distributed scenario between the MP 101 and other neighboring MPs. FIGS. 4C and 4D show such a distributed scenario of power capability information exchanged between the MP 101 and an MP 102 similar to that shown in FIGS. 4A and 4B.

According to the present invention, solicited (request/report-type) and un-solicited receiving of allowed power setting information 401, 403 can be sent as a piggy-backed IE on top of a Mesh unicast, multicast or broadcast management or control frame. Alternatively, the allowed power setting information 401, 403 can be sent as a separate Mesh unicast, multicast or broadcast management or control frame.

As an example of a Mesh management frame embodiment, the signaling of allowed power setting information 401, 403 in the Mesh may be included as part of a Mesh BEACON frame or a Mesh PROBE RESPONSE frames (e.g. signaling frames and exchanges for the purpose of discovering the presence of a Mesh network or synchronizing general Mesh parameters such as timer values). Alternatively, the MP power allowed power setting information 401, 403 is part of Mesh ASSOCIATION or Mesh AUTHENTICATION frames (e.g. frame exchanges with other MPs for the purpose of becoming part of the Mesh network). In another alternative, the allowed power setting information is part of a directed special purpose per-link or multi-hop Mesh ALLOWED POWER SETTING frame.

Allowed power setting information 401, 403 can be signaled for any of the following, either alone or in combination: the entire Mesh (e.g. valid for all nodes in the Mesh); a particular Mesh link or path (e.g. valid for a set of Mesh nodes); a particular Mesh node (e.g. valid for all radio channels of an MP); a particular radio interface of a Mesh node (e.g. settable per-link and per-neighbor of an MP).

Allowed power setting information 401, 403 can be signaled as absolute values, relative values relating to some pre-determined absolute value, or a combination of absolute and relative values (e.g. max admissible Tx power=regulatory max−temporary offset).

Figure 5:
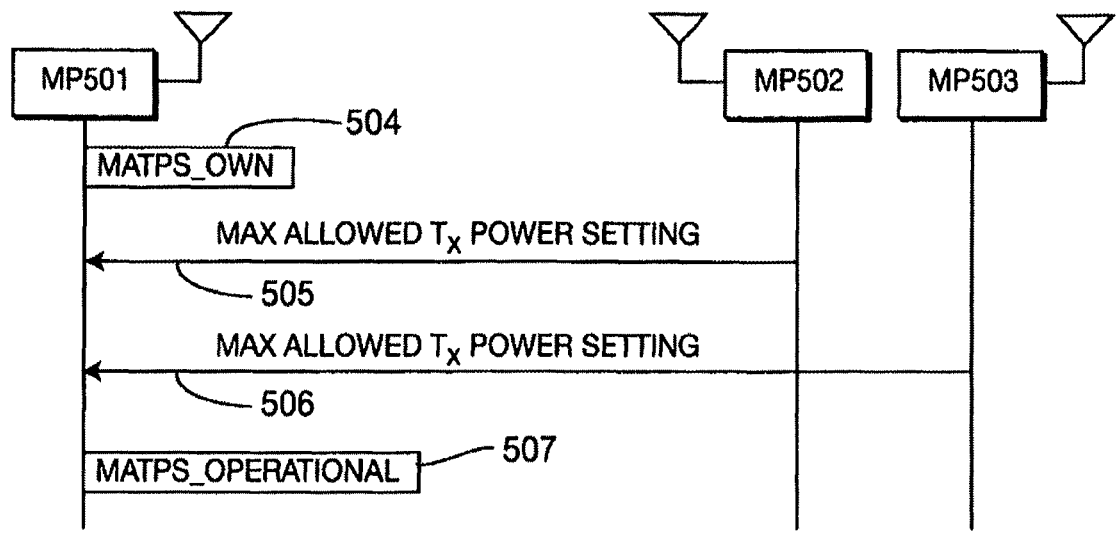
FIG. 5 shows a signal diagram for transmit power control according to the present invention.

Turning to FIG. 5, a distributed scenario is now described in reference to an MP 501, in which there is no PM and it is possible that the MP 501 receives different allowed power setting information from two or more MPs, shown as an MP 502 and an MP 503. With no PM in the distributed scenario, the MP 501 needs to determine which allowed power setting information it will use when setting its own Tx power settings and when signaling its allowed power setting information to the other MPs, MP 502 and MP 503. The signaling procedure shown in FIG. 5 resolves a situation in which the MP 501 determines which allowed power setting information to use while resolving a conflict with mismatched allowed power setting information received from other MPs.

The MP 501 configures its own allowed power setting information APSI_own, while receiving APSI_i which represents the allowed power setting information signaled from MP_i with index i=2 and 3 for the example shown in FIG. 5. The APSI_i values can be further represented by a vector APSI_vector, which represents the ensemble of the APSI_i values MP 501 receives from the other MPs.

An example of an allowed power setting information IE includes a Maximum Allowed Tx Power Setting (MATPS). For the sake of simplicity, the following method illustration includes only the MATPS IE. From a set of inputs MATPS_own 504 and MATPS_vector values 505, 506, the MP 501 needs to determine which MATPS will be used when setting its own Tx Power settings and when signaling allowed power setting information to other MPs. This can be achieved by implementing a decision-making function F in MP 501.

For example, assume MP 501 receives MATPS_vector which comprises two vector value settings 505, 506: MATPS_1=20 dBM from MP 502 and MATPS_2=10 dBm from MP 503. Also assume that MP 501's own MATPS setting is configured to be MATPS_own=15 dBm. In the preferred implementation, the function F will determine the minimum MATPS value from all its inputs (i.e., min(10,20, 15)=10 dBM) and the MP 501 will use an operational MATPS value when setting its Tx Power and it will signal it as part of the allowed power setting information that the MP 501 signals to other MPs, including MP1 and MP2. Accordingly, the operational MATPS 507 in terms of function F can be expressed as follows:

$$\text{MATPS\_operational} = F(\text{MATPS\_own}, \text{MATPS\_vector}) \quad \text{Equation (1)}$$
$$= \min(\text{MATPS\_own}, \text{MATPS\_vector}).$$

Similarly, other operational power settings can be selected using a suitable function F.

In an alternative embodiment, the MP 501 uses the value MATPS_operational determined by Equation(1) while determining its Tx Power, but MP 501 signals the MATPS_own value as its allowed power setting information to the other MPs, MP502 and MP503.

Figure 6:
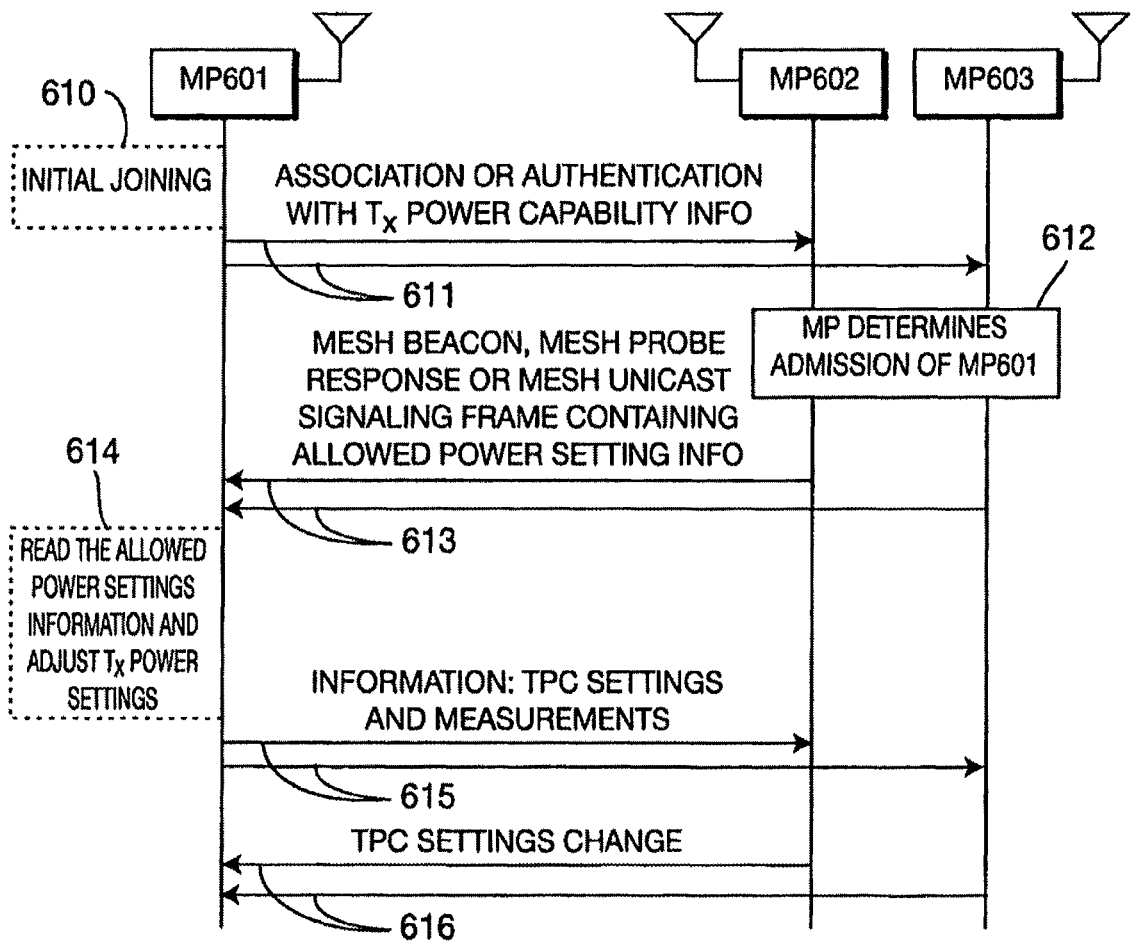
FIG. 6 shows a signal diagram for adjustment of MP transmit power settings in response to received allowed power setting information.

FIG. 6 shows a signaling method for an MP601 entering a Mesh 600 in which the Tx Power is adjusted to meet regulatory requirements. While the Tx Power setting adjustment is described in reference to MP601, the same Tx Power setting adjustment procedure applies to each MP in the Mesh 600. The Tx power can be similarly controlled for a subset of MPs. The Mesh 600 comprises MP602-MPN at the time that the MP601 seeks entry. One or more of the MPs MP602-MPN may be a PM. At initial joining 610, at switch-on, MP601 sends its Tx Power capability information 611 to MP602-MPN as described above for FIGS. 3A-3D. As aforementioned, a preferred way to send the Tx power capability information is as part of ASSOCIATION or AUTHENTICATION (or Re-ASSOCIATION or Re-AUTHENTICATION) frames. The Tx Power Capability information 611 may be performed periodically or in a solicited or in an un-solicited manner. At step 612, the MP601 becomes part of the Mesh. The MP601 receives allowed power settings information 613 which is sent periodically in the Mesh or in an un-solicited manner or in a solicited manner by the Mesh neighbors MP602-MPN, during the process of discovery or joining the Mesh network. The allowed power setting information is exchanged as described above for FIGS. 4A-4D. As aforementioned, a preferred way of such signaling is to use Mesh BEACON or Mesh PROBE RESPONSE frames. At step 614, the MP601 reads the received allowed power settings information 613 and adjusts its Tx power settings. The MP601 may or may not acknowledge its Tx power setting adjustment to the other MPs MP602-MPN.

The MP601 sends its own allowed power setting information 615 to MP602-MPN. Likewise, the MP601 receives Tx Power setting changes from MP602-MPN, triggered by changes in their Tx Power settings. Several optional and complementary signaling extensions are possible (not shown in FIG. 6) to support adjustment of power settings in the Mesh. For example, the MP601 can request reporting of measurements from its MP neighbors MP602-MPN regarding power settings, perceived SNR and link margin values, perceived interference power and channel busy times.

According to the present invention, a selection procedure is performed by the Mesh MPs for negotiating and selecting a Mesh PM. The preferred PM selection and re-selection procedure includes one or more of the following:

a) The first MP to belong in the Mesh automatically becomes PM.
b) An MP at switch-on determines if one of its neighbors is a PM. The PM can be identified by means of L2 or L3 broadcast, multicast or dedicated signaling received by the MP as part of the set-up procedures, (e.g. authentication, Mesh BEACON reception, capability exchanges and so on).
c) The PM can be pre-set, (i.e. fixed for the lifetime of the Mesh) or time-limited, (i.e., after a certain pre-determined amount of time or tied to the occurrence of certain conditions, the PM selection procedure is re-initiated)
d) In one advantageous realization, the PM coincides with the Mesh Portal and Mesh Portal identifiers therefore automatically point to the PM.
e) The MPs with the most links to neighbors becomes the PM.
f) The MPs determine the PM by means of a random number draw.
g) The MPs determine the PM as a function of the number of hops from the Mesh Portal or from a certain agreed-upon MP.
h) Any combination of the above.

Figure 7:
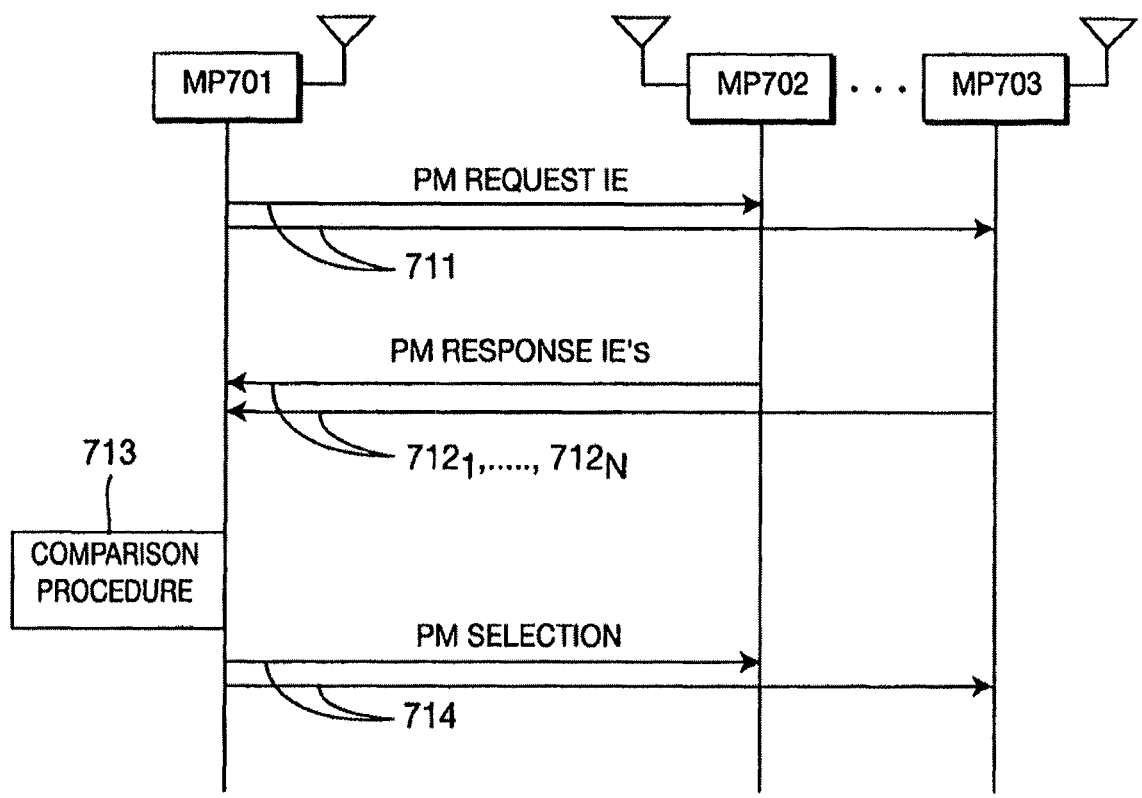
FIG. 7 shows a signal diagram of a power master selection procedure.

FIG. 7 shows a signaling diagram for identifying the Mesh PM according to the preferred methods described above. A PM Request Information Element (IE) is included as part of a broadcast/multicast/unicast signaling frame in signal 711 sent through the Mesh by MP 701 indicating to neighbor MPs MP702-MPN that a PM selection is required. This IE contains the address of the originating MP and other parameters, such as time-out values, selection criteria, default identifier for the proposed PM, reply-to address, and so on. A PM Response IE part of a broadcast/multicast/unicast signaling frame in signals 712 is sent through the Mesh containing the selection criteria response from the neighbor MPs MP702-MPN. A comparison procedure 713 is initiated in the MP701 where the selection criteria responses 7121 . . . 712N from the different neighbor MPs are evaluated. The PM selection decision is made based on which MP meets the requirements in terms of the chosen selection criteria, (e.g., highest random number draw or similar). The MP 701 broadcasts its final selection for PM to the Mesh in signal 713.

Alternatively, the MP 701 acts as the Mesh Portal and sets all of the Tx Power control settings for the Mesh and subsequently joining MPs are mandated to propagate these Tx Power control settings to other Mesh MPs.

The signaling messages and information exchanged between MPs or between MPs and the PM for the above described methods are preferably implemented as Layer L2 (e.g. MAC layer) signaling frames or IEs. As such, the physical implementation is a processor entity within each MP, such as MP101 MP102 and the PM shown in FIGS. 3A-3D, 4A-4D; MP 501, MP502, MP503 as shown in FIG. 5; MP601, MP602-MPN as shown in FIG. 6; and MP701, MP702-MPN as shown in FIG. 7. The processor entity may include for example, Layer L2 hardware or software in medium access control (MAC) or station management entity (SME). The layer L2 software, for example may be part of operation and maintenance (O&M) routines in MPs; or a combination thereof. Alternatively, the signaling is implemented as Layer L3 or above signaling packets or IEs, (e.g. encapsulated into IP packets, or into TCP/IP packets and so on). As such, the physical implementation would include Layer L3 hardware or software, such as IP or simple network management protocol (SNMP) entities. Another alternative includes a combination of Layer L2 and L3 signaling thereof.

All signaling messages and information exchanged as aforementioned can be either direct-link (e.g., MP-MP signaling frames) or multi-hop frame signaling (e.g., MP sending a message to another MP via intermediate forwarding MPs). Furthermore, signaling can take place between MPs and other nodes in the wired backhaul.

All methods described above can be subject to or are complemented by configuration settings in the individual MPs and can provide statistics and feedback to Mesh-internal or external network monitoring and control entities (e.g., using remote IT administrator network monitoring software) that can exercise control on MP's operational characteristics. These configuration settings and reportable statistics can be set in or reported from individual (or groups) of MPs by any of the following formats or a combination thereof:

a) databases in the physical layer (PHY), medium access control (MAC) or system management entity (SME), advantageously realized (but not limited to) in the form of management information bases (MIBs);
b) signaling messages between L2 MAC or SME to above protocol entities, advantageously realized in the form of APIs; or c) primitives exchanged between SME, MAC, PHY and other protocol entities in an MP implementation.

The above described configuration settings that can be used by external management entities on the MP (or groups of MPs) can contain any of the following:
  a) Admissible Tx, Rx and CCA value setting and ranges;
  b) Admissible mode settings (e.g. 11a,b,g,j,n and so on);
  c) Admissible band and sub-band settings (e.g. 2.4, 4.9, 5 GHz, U-NII lower, middle and upper band and so on);
  d) Mesh TPC feature on or off;
  e) Addresses and identifiers for PM;
  f) Timer values (e.g. channel dwell and measurement intervals) for TPC;
  g) Transmit Power change command for the MP; or
  h) Any combination thereof.

Reportable statistics in the MP that can be used by external management entities may include, but is not limited to any of the following, or a combination thereof:
  a) Current Tx power control settings, modes, bandwidth, number of simultaneous channels (or combination thereof) of MP and neighbor MPs (as far as known); or
  b) Channel statistics such as the value and type of measurements performed and so on.

What is claimed is:

1. A method for use in a station (STA), the method comprising:
    transmitting, to an access point (AP), a probe request frame that includes an indicator indicating a plurality of operational bandwidths that the STA supports;
    receiving, from the AP, a probe response frame that includes a plurality of indicators indicating one or more maximum transmission powers associated with the plurality of operational bandwidths that the STA supports; and
    transmitting, to the AP, a signal at a transmission power determined based on the indicated one or more maximum transmission powers in the probe response frame.

2. The method of claim 1, wherein the signal transmitted to the AP is an association request frame or a reassociation request frame.

3. The method of claim 1, wherein the probe response frame includes at least one of transmission power step size information, receive power step size information, operational mode information, bandwidth information, or frequency band information.

4. The method of claim 3, wherein the transmission power step size information includes minimum transmission power information or adjustment step size settings.

5. The method of claim 3, wherein the receive power step size information includes minimum receive power information, maximum receive power information, receive power adjustment step size settings, receive power sensitivity level information, or clear channel assessment (CCA) thresholds settings.

6. The method of claim 3, wherein the frequency band information includes a number of simultaneously operable bands or sub-bands.

7. The method of claim 1, wherein the probe response frame includes a field indicating allowed power setting information for the STA.

8. The method of claim 1, wherein the plurality of operational bandwidths includes at least a 20 MHz channel bandwidth and a 40 MHz channel bandwidth.

9. The method of claim 1, wherein the signal is transmitted using one of the plurality of operational bandwidths.

10. A station (STA) comprising:
    a processor;
    a transmitter; and
    a receiver,
    the processor and the transmitter configured to transmit, to an access point (AP), a probe request frame that includes an indicator indicating a plurality of operational bandwidths that the STA supports;
    the processor and the receiver configured to receive, from the AP, a probe response frame that includes a plurality of indicators indicating one or more maximum transmission powers associated with the plurality of operational bandwidths that the STA supports; and
    the processor and the transmitter configured to transmit, to the AP, a signal at a transmission power determined based on the indicated one or more maximum transmission powers in the probe response frame.

11. The STA of claim 10, wherein the signal transmitted to the AP is an association request frame or a reassociation request frame.

12. The STA of claim 10, wherein the probe response frame includes at least one of transmission power step size information, receive power step size information, operational mode information, bandwidth information, or frequency band information.

13. The STA of claim 12, wherein the transmission power step size information includes minimum transmission power information or adjustment step size settings.

14. The STA of claim 12, wherein the receive power step size information includes minimum receive power information, maximum receive power information, receive power adjustment step size settings, receive power sensitivity level information, or clear channel assessment (CCA) thresholds settings.

15. The STA of claim 12, wherein the frequency band information includes a number of simultaneously operable bands or sub-bands.

16. The STA of claim 10, wherein the probe response frame includes a field indicating allowed power setting information for the STA.

17. The STA of claim 10, wherein the plurality of operational bandwidths includes at least a 20 MHz channel bandwidth and a 40 MHz channel bandwidth.

18. The STA of claim 10, wherein the signal is transmitted using one of the plurality of operational bandwidths.

19. A station (STA) comprising:
    a processor;
    a transmitter; and
    a receiver,
    the processor and the receiver configured to receive, from an access point (AP), a beacon frame that includes a plurality of indicators indicating one or more maximum transmission powers associated with a plurality of operational bandwidths that the STA supports; and
    the processor and the transmitter configured to transmit, to the AP, a signal at a transmission power determined based on the indicated one or more maximum transmission powers in the beacon frame.

20. The STA of claim 19, wherein the plurality of operational bandwidths includes at least a 20 MHz channel bandwidth and a 40 MHz channel bandwidth, and the signal is transmitted using one of the plurality of operational bandwidths.

* * * * *